(12) United States Patent
Babu et al.

(10) Patent No.: US 11,605,222 B2
(45) Date of Patent: Mar. 14, 2023

(54) APPARATUS AND SYSTEM RELATED TO AN INTELLIGENT HELMET

(71) Applicant: Robert Bosch GmbH, Stuttgart (DE)

(72) Inventors: Benzun Pious Wisely Babu, San Jose, CA (US); Mao Ye, San Jose, CA (US); Liu Ren, Cupertino, CA (US)

(73) Assignee: ROBERT BOSCH GMBH

( * ) Notice: Subject to any disclaimer, the term of this patent is extended or adjusted under 35 U.S.C. 154(b) by 0 days.

(21) Appl. No.: 16/672,384

(22) Filed: Nov. 1, 2019

(65) Prior Publication Data
US 2021/0133447 A1 May 6, 2021

(51) Int. Cl.
| | |
|---|---|
| G06V 20/20 | (2022.01) |
| G06F 3/01 | (2006.01) |
| H04W 4/48 | (2018.01) |
| H04N 5/225 | (2006.01) |
| G02B 27/01 | (2006.01) |
| G06K 9/62 | (2022.01) |
| G06V 20/56 | (2022.01) |
| G06V 20/59 | (2022.01) |

(52) U.S. Cl.
CPC ......... *G06V 20/20* (2022.01); *G02B 27/0101* (2013.01); *G06F 3/012* (2013.01); *G06F 3/013* (2013.01); *G06K 9/6289* (2013.01); *G06V 20/56* (2022.01); *G06V 20/597* (2022.01); *H04N 5/2253* (2013.01); *H04W 4/48* (2018.02); *G02B 2027/014* (2013.01); *G02B 2027/0138* (2013.01)

(58) Field of Classification Search
CPC .................................. A42B 3/042; A42B 3/30
See application file for complete search history.

(56) References Cited

U.S. PATENT DOCUMENTS

| | | | | |
|---|---|---|---|---|
| 10,147,023 | B1 * | 12/2018 | Klaudiny | ............ G06V 10/774 |
| 2009/0079761 | A1 * | 3/2009 | Kokojima | ............ H04N 13/111 |
| | | | | 345/619 |
| 2018/0129202 | A1 * | 5/2018 | Guo | .................... G05D 1/0061 |
| 2018/0140213 | A1 * | 5/2018 | Kim | ...................... G16H 50/20 |
| 2019/0248275 | A1 * | 8/2019 | Cook | ...................... B62J 6/056 |
| 2020/0128902 | A1 * | 4/2020 | Brown | .................. A42B 3/042 |

OTHER PUBLICATIONS

C. Tran and M. M. Trivedi, "Driver assistance for 'Keeping Hands on the Wheel and Eyes on the Road,'" in 2009 IEEE International Conference on Vehicular Electronics and Safety (ICVES), 2009, pp. 97-101, 5 pages.

(Continued)

*Primary Examiner* — Ming Wu
(74) *Attorney, Agent, or Firm* — Dickinson Wright PLLC (57) ABSTRACT

A helmet includes a transceiver configured to receive vehicle data from one or more sensors located on a vehicle. The helmet also includes an inertial movement unit (IMU) configured to collect helmet motion data of a rider of the vehicle and a processor in communication with the transceiver and IMU, and programmed to receive, via the transceiver, vehicle data from the one or more sensors located on the vehicle and determine a rider attention state utilizing the vehicle data from the one or more sensors located on the vehicle and the helmet motion data from the IMU.

20 Claims, 4 Drawing Sheets

(56) References Cited

OTHER PUBLICATIONS

M. Toma, L. J. M. Rothkrantz, and C. Antonya, "Car driver skills assessment based on driving postures recognition," in 2012 IEEE 3rd International Conference on Cognitive Infocommunications (CogInfoCom), 2012, pp. 439-446, 8 pages.

E. Ohn-Bar and M. M. Trivedi, "Looking at Humans in the Age of Self-Driving and Highly Automated Vehicles," IEEE Transactions on Intelligent Vehicles, vol. 1, No. 1, pp. 90-104, Mar. 2016, 15 pages.

E. D. Bekiaris, A. Spadoni, and S. I. Nikolaou, "Saferider Project: New safety and comfort in Powered Two Wheelers," in 2009 2nd Conference on Human System Interactions, 2009, pp. 600-602, 3 pages.

M. Pieve, F. Tesauri, and A. Spadoni, "Mitigation accident risk in powered two Wheelers domain: Improving effectiveness of human machine interface collision avoidance system in two wheelers," in 2009 2nd Conference on Human System Interactions, 2009, pp. 603-607, 5 pages.

V. Cossalter, G. Dalla, R. Lot, and M. Massaro, "An advanced multibody model for the analysis of motorcycle dynamics," Proc. International Conference on Mechanical Engineering and Mechanics, vol. 1, 2009, 7 pages.

S. Zhu, S. Murakami, and H. Nishimura, "Motion analysis of a motorcycle taking into account the rider's effects," Vehicle System Dynamics, vol. 50, No. 8, pp. 1225-1245, 2012, 22 pages.

I. Symeonidis, G. Kavadarli, S. Erich, M. Graw, and S. Peldschus, "Analysis of the stability of PTW riders in autonomous braking scenarios," Accident Analysis & Prevention, vol. 49, pp. 212-222, 2012, 11 pages.

G. Kumarasamy, N. K. Prakash, and P. S. Mohan, "Rider assistance system with an active safety mechanism," in 2015 IEEE International Conference on Computational Intelligence and Computing Research (ICCIC), 2015, pp. 1-6, 6 pages.

T. Serre, C. Masson, C. Perrin, J.-L. Martin, A. Moskal, and M. Llari, "The motorcyclist impact against a light vehicle: Epidemiological, accidentological and biomechanic analysis," Accident Analysis & Prevention, vol. 49, pp. 223-228, 2012, 6 pages.

S. Dimoulas, B. Psarianos, C. Antoniou, and S. Vardaki, "Powered two-wheeler rider eye-height determination," Transportation Letters, vol. 6, No. 2, pp. 67-77, 2014, 16 pages.

Y.-C. Liu, "Effects of using head-up display in automobile context on attention demand and driving performance," Displays, vol. 24, No. 4, pp. 157-165, 2003, 9 pages.

A. Filippeschi, N. Schmitz, M. Miezal, G. Bleser, E. Ruffaldi, and D. Stricker, "Survey of Motion Tracking Methods Based on Inertial Sensors: A Focus on Upper Limb Human Motion," Sensors (Basel, Switzerland), vol. 17, No. 6, p. 1257, Jun. 2017, 40 pages.

A. I. Mourikis and S. I. Roumeliotis, "A Multi-State Constraint Kalman Filter for Vision-aided Inertial Navigation," in Proc. IEEE Int. Conf. International Conference on Robotics and Automation, Hamburg, Germany, 2007, pp. 3565-3572, 8 pages.

S. Leutenegger, S. Lynen, M. Bosse, R. Siegwart, and P. Furgale, "Keyframe-based visual-inertial odometry using nonlinear optimization," The International Journal of Robotics Research, vol. 34, No. 3, pp. 314-334, 2015, 26 pages.

T. Lupton and S. Sukkarieh, "Visual-Inertial-Aided Navigation for High-Dynamic Motion in Built Environments Without Initial Conditions," IEEE Transactions on Robotics, vol. 28, No. 1, pp. 61-76, Feb. 2012, 16 pages.

D. Mehta et al., "VNect: Real-time 3D Human Pose Estimation with a Single RGB Camera," CoRR, vol. abs/1705.01583, 2017, 14 pages.

\* cited by examiner

APPARATUS AND SYSTEM RELATED TO AN INTELLIGENT HELMET

TECHNICAL FIELD

The present disclosure relates to intelligent helmets, such as those utilized on motorcycles or other vehicles including dirt bikes, three-wheeler vehicles, or four-wheeler vehicles such as an all-terrain vehicle or the like.

BACKGROUND

Continuous monitoring of a motorcycle rider may be difficult due to resource constraints and limitations on powered two-wheelers (PTW). In contrast to automotive vehicle safety systems, motorcycles may have technologies that are not transferrable due to various constraints in PTW due to the difference in the environment and design.

Motorcycles may include Advanced Rider Assistance System (ARAS) to help with various functions, such as adaptive cruise control, blind spot detection, etc. ARAS systems may be utilized primarily to generate data by the vehicle. The systems may provide warning indicators to enable safety for a rider of a PTW.

SUMMARY

According to one embodiment, a helmet includes a transceiver configured to receive vehicle data from one or more sensors located on a vehicle. The helmet also includes an inertial measurement unit (IMU) configured to collect helmet motion data of a rider of the vehicle and a processor in communication with the transceiver and IMU. The processor is further programmed to receive, via the transceiver, vehicle data from the one or more sensors located on the vehicle and determine a rider attention state utilizing the vehicle data from the one or more sensors located on the vehicle and the helmet motion data from the IMU.

According to a second embodiment, a system includes a helmet and a vehicle with at least two wheels. The system includes a helmet transceiver configured to receive vehicle data from one or more sensors located on a vehicle, a helmet inertial measurement unit (IMU) configured to collect helmet motion data of a rider of the vehicle. The motorcycle also includes a rider-facing camera located on the vehicle and configured to monitor the rider of the vehicle and collect rider image data. The system also includes a processor in the helmet in communication with the helmet transceiver and helmet IMU. The processor is programmed to receive, via the helmet transceiver, vehicle data from the one or more sensors located on the vehicle and determine a rider attention state utilizing the vehicle data from the one or more sensors located on the vehicle and the helmet motion data from the IMU.

According to a third embodiment, a motorcycle includes a transceiver configured to send to a helmet, motorcycle data from one or more sensors located on the motorcycle, and receive helmet data from the motorcycle. The motorcycle also includes a vehicle inertial measurement unit (IMU) configured to collect vehicle motion data of a rider of the motorcycle and a processor in communication with the transceiver and vehicle IMU. The processor is programmed to receive helmet data from one or more sensors located on the helmet and determine a rider attention utilizing the helmet data from the one or more sensors located on the vehicle and the vehicle motion data from the vehicle IMU.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Continuous monitoring of the rider state may be essential for ARAS to work with an active safety system. Rider posture, head position, and orientation may be essential for active ARAS. Furthermore, recognizing contacts may enable dynamic rider-bike models. In contrast to automobiles, PTWs may require a helmet. Modern smart motorcycles helmets may extend the instrument cluster and dashboard to provide critical information on a Heads Up Display (HUD). Sensors may be added to the helmet to enable tracking of the rider head pose to help determine intentions of the human driver, or to be used to determine what content to display on the HUD. A system may allow for continuous monitoring of the rider's attention, posture, contacts, and spatial relationship with the PTW through use of visual and inertial sensors on the helmet and the PTW.

The rider state may be described by the pose (e.g. position and orientation) of the head, upper body joints and contacts with respect to the PTW and the world. Using the rider state estimated, it is possible to determine the rider attention, posture, slip, etc. needed for ARAS applications. The rider attention may refer to the direction of view that the rider's eyes are focused on. The rider posture may refer to the position of the rider's back, neck, shoulders, arms, and other upper body parts. The rider contacts may refer to the rider's grip between the rider's hands and handlebars or other parts of the motorcycle. The rider slip may reference to the contact between a rider's bottom portion and seat of a motorcycle. Other rider state information may include the rider-to-vehicle relation and the rider-to-world relation.

Figure 1:
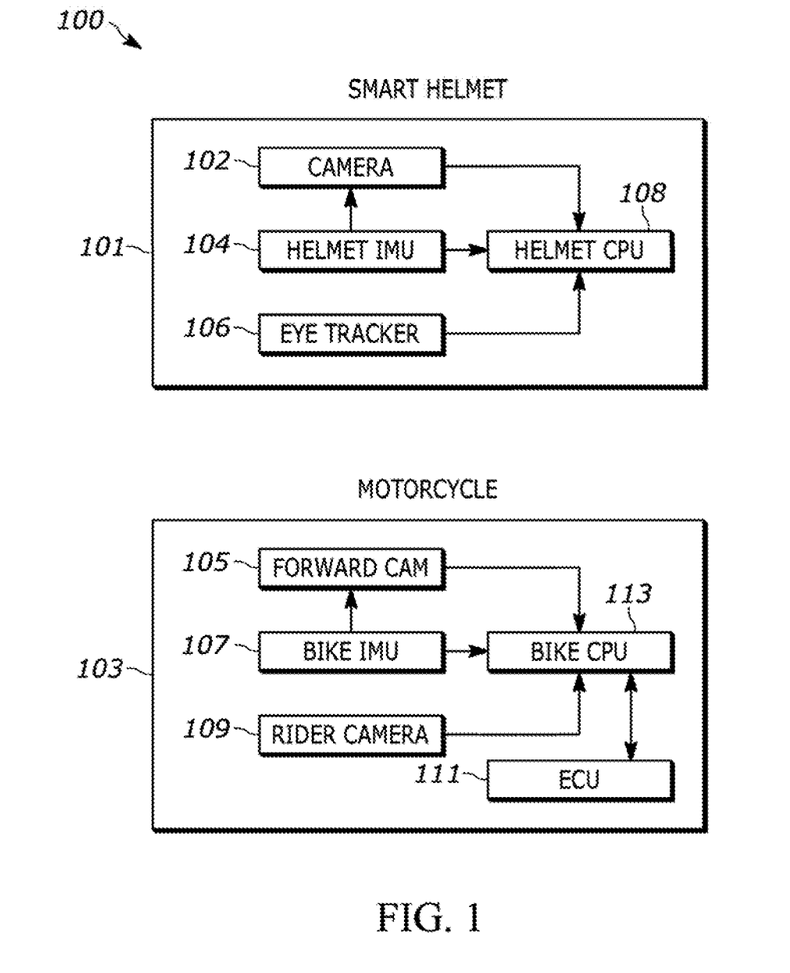
FIG. 1 is an example of a system design 100 that includes a smart helmet and a motorcycle.

FIG. 1 is an example of a system design 100 that includes a smart helmet 101 and a motorcycle 103. The smart helmet 101 and motorcycle 103 may include various components and sensors that interact with each other. The smart helmet 101 may focus on collecting data related to body and head movement of a driver. In one example, the smart helmet 101 may include a camera 102. The camera 102 of the helmet 101 may include a primary sensor that is utilizing for position and orientation recognition in moving vehicles. Thus, the camera 102 may face outside of the helmet 101 to track other vehicles and objects surrounding a rider. The camera 102 may have difficulty capturing dynamics of such objects and vehicles. In another example, the helmet 101 may be included with radar or LIDAR sensors, in addition to or instead of the camera 102.

The helmet 101 may also include a helmet inertial measurement unit (IMU) 104. The helmet IMU 104 may be utilized to track high dynamic motion of a rider's head. Thus, the helmet IMU 104 may be utilized to track the direction a rider is facing or the rider viewing direction. Additionally, the helmet IMU 104 may be utilized for tracking sudden movements and other issues that may arise. An IMU may include one or more motion sensors.

An Inertial Measurement Unit (IMU) may measure and report a body's specific force, angular rate, and sometimes the magnetic field surrounding the body, using a combination of accelerometers and gyroscopes, sometimes also magnetometers. IMUs are typically used to maneuver aircraft, including unmanned aerial vehicles (UAVs), among many others, and spacecraft, including satellites and landers. The IMU may be utilized as a component of inertial navigation systems used in various vehicle systems. The data collected from the IMU's sensors may allow a computer to track a motor position.

An IMU may work by detecting the current rate of acceleration using one or more accelerometers, and detect changes in rotational attributes like pitch, roll and yaw using one or more gyroscopes. Typical IMU also includes a magnetometer, which may be used to assist calibration against orientation drift. Inertial navigation systems contain IMUs that have angular and linear accelerometers (for changes in position); some IMUs include a gyroscopic element (for maintaining an absolute angular reference). Angular rate meters measure how a vehicle may be rotating in space. There may be at least one sensor for each of the three axes: pitch (nose up and down), yaw (nose left and right) and roll (clockwise or counter-clockwise from the cockpit). Linear accelerometers may measure non-gravitational accelerations of the vehicle. Since it may move in three axes (up & down, left & right, forward & back), there may be a linear accelerometer for each axis. The three gyroscopes are commonly placed in a similar orthogonal pattern, measuring rotational position in reference to an arbitrarily chosen coordinate system. A computer may continually calculate the vehicle's current position. For each of the six degrees of freedom (x, y, z and Ox, Oy, and Oz), it may integrate over time the sensed acceleration, together with an estimate of gravity, to calculate the current velocity. It may also integrate the velocity to calculate the current position. Some of the measurements provided by an IMU are below:

$$\hat{a}_B = R_{BW}(a_w - g_w) + b_a + \eta_a$$

$$\hat{\omega}_B = \omega_B + b_g + \eta_g$$

$(\hat{a}_B, \hat{\omega}_B)$ are the raw measurements from the IMU in the body frame of the IMU. $a_w$, $\omega_B$ are the expected correct acceleration and the gyroscope rate measurements. $b_a$, $b_g$ are the bias offsets in accelerometer and the gyroscope. $\eta_a$, $\eta_g$ are the noises in accelerometer and the gyroscope.

The helmet 101 may also include an eye tracker 106. The eye tracker 106 may be utilized to determine a direction of where a rider of the motorcycle 103 is looking. The eye tracker 106 can also be utilized to identify drowsiness and tiredness or a rider of the PTW. The eye tracker 106 may identify various parts of the eye (e.g. retina, cornea, etc.) to determine where a user is glancing. The eye tracker 106 may include a camera or other sensor to aid in tracking eye movement of a rider.

The helmet 101 may also include a helmet processor 108. The helmet processor 107 may be utilized for sensor fusion of data collected by the various camera and sensors of both the motorcycle 103 and helmet 101. In other embodiment, the helmet may include one or more transceivers that are utilized for short-range communication and long-range communication. Short-range communication of the helmet may include communication with the motorcycle 103, or other vehicles and objects nearby. In another embodiment, long-range communication may include communicating to an off-board server, the Internet, "cloud," cellular communication, etc. The helmet 101 and motorcycle 103 may communicate with each other utilizing wireless protocols implemented by a transceiver located on both the helmet 101 and motorcycle 103. Such protocols may include Bluetooth, Wi-Fi, etc. The helmet 101 may also include a heads-up display (HUD) that is utilized to output graphical images on a visor of the helmet 101.

The motorcycle 103 may include a forward-facing camera 105. The forward-facing camera 105 may be located on a headlamp or other similar area of the motorcycle 103. The forward-facing camera 105 may be utilized to help identify where the PTW is heading. Furthermore, the forward-facing camera 105 may identify various objects or vehicles ahead of the motorcycle 103. The forward-facing camera 105 may thus aid in various safety systems, such as an intelligent cruise control or collision-detection systems.

The motorcycle 103 may include a bike IMU 107. The bike IMU 107 may be attached to a headlight or other similar area of the PTW. The bike IMU 107 may collect inertial data that may be utilized to understand movement of the bike. The bike IMU 107 may be a multiple axis accelerometer, such as a three-axis, four-axis, five-axis, six-axis, etc. The bike IMU 107 may also include multiple gyros. The bike IMU 107 may work with a processor or controller to determine the bike's position relative to a reference point, as well as its orientation.

The motorcycle 103 may include a rider camera 109. The rider camera 109 may be utilized to keep track of a rider of the motorcycle 103. The rider camera 109 may be mounted in various locations along a handlebar of the motorcycle, or other locations to face the rider. The rider camera 109 may be utilized to capture images or video of the rider that are in turn utilized for various calculations, such as identifying various body parts or movement of the rider. The rider camera 109 may also be utilized to focus on the eye's of the rider. As such, eye gaze movement may be determined to figure out where the rider is looking.

The motorcycle 103 may include an electronic control unit 111. The ECU 111 may be utilized to process data collected by sensors of the motorcycle, as well as data collected by sensors of the helmet. The ECU 111 may utilize the data received from the various IMUs and cameras to process and calculate various positions or to conduct object recognition. The ECU 111 may be in communication with the rider camera 109, as well as the forward-facing camera 105. For example, the data from the IMUs may be fed to the ECU 111 to identify position relative to a reference point, as well as orientation. When image data is combined with such calculations, the bike's movement can be utilized to identify where a rider is facing or focusing on. The image data from both the forward facing camera on the bike and the camera on the helmet are compared to determine the relative orientation between the bike and the riders head. The image comparison can be performed based on spares features extracted from both the cameras (e.g., rider camera 109 and forward-facing camera 105). The motorcycle 103 may include a bike central processing unit 113. The system may thus continuously monitor the rider attention, posture, position, orientation, contacts (e.g., grip on handlebars), rider slip (e.g. contact between rider and seat), rider to vehicle relation, and rider to world relation.

Figure 2:
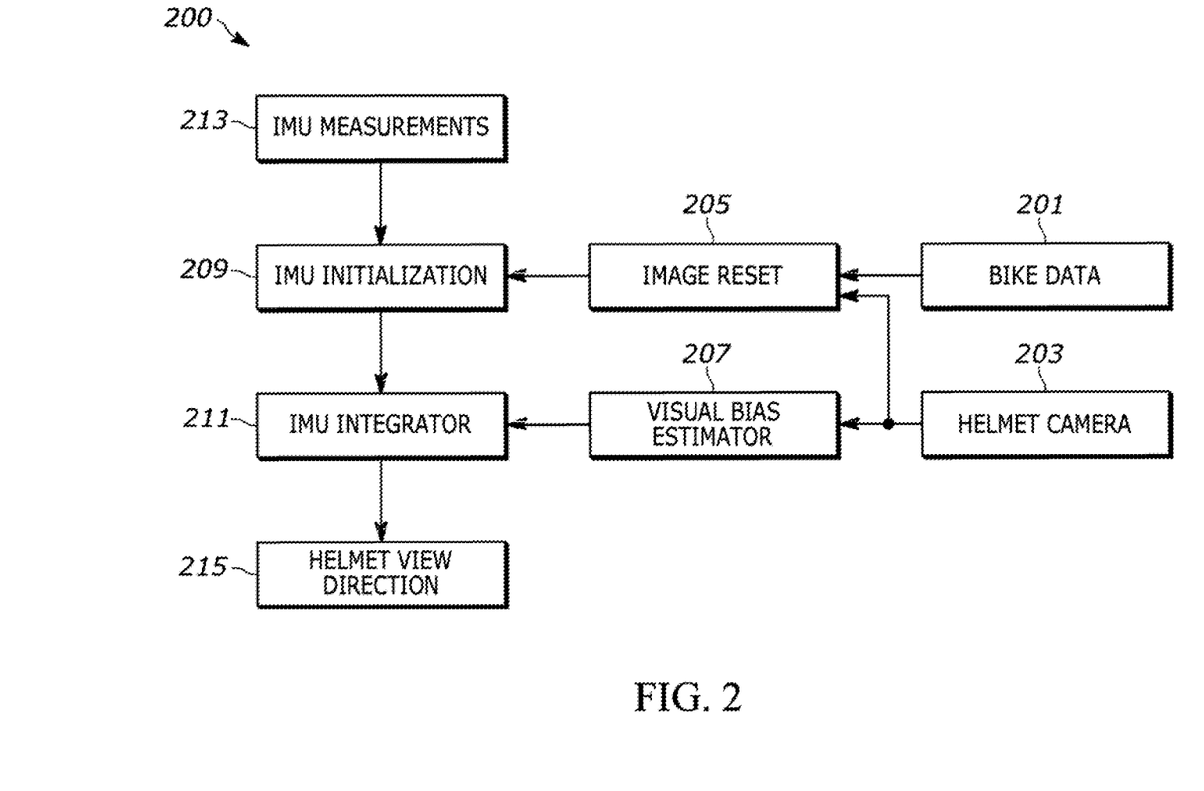
FIG. 2 is example of a flow chart 200 for rider attention verification.

FIG. 2 is example of a flow diagram 200 for rider attention verification. The rider attention verification system may help determine if the PTW heading direction and the rider view direction are aligned. This verification may allow determination of rider intent and thus provide adaptive content on a head mounted display or HUD. The flow diagram 200 may be fully or partly implemented on a processor or controller of a helmet, PTW, or off-board server (e.g. "cloud").

The motorcycle data 201 may be collected and provided to other modules. The motorcycle data may include the data gathered and collected as discussed with respect to FIG. 1. For example, the motorcycle data may include image data or other data collected from a camera or similar sensor in the motorcycle. This may include the image data from the rider camera or forward-facing camera. Furthermore, this may include any motorcycle IMU data collected.

The helmet camera 203 data may be collected and provided to other modules. The helmet camera data may include images and other data gathered and collected by the smart helmet, as discussed with respect to FIG. 1. For example, the helmet camera data may include image data or other data collected from a camera or similar sensor in the helmet that may focus on the rider's face, or that may be forward-facing to collect image information on the user's environment. This may include the image data from the rider camera or forward-facing camera. Furthermore, this may include any motorcycle IMU data collected.

An image reset 205 may be fed motorcycle data 201 and helmet camera data 203. Image reset 205 may be the correction needed to correct drift errors of the IMU. For example, the bike data and helmet camera are input into the system, which may include image data from the camera on the bike as well as the camera on the helmet. The IMU measurements are continuously integrated to obtain position and orientation estimates. Hence measurement errors create drift that may be irrecoverable. The system may make use of the images and other data collected based on where the bike is facing/looking at (utilizing orientation and GPS data) to correct the drift. The system will visually compare the helmet camera data (e.g. image data) and the bike camera data to determine if the IMU needs to be corrected or adjusted. However, if the images are similar or the same, the IMU measurement integration is reset, this will clear the effect of the accumulated drift error. The image reset improves the orientation estimated with respect to the bike, as utilizing only the IMU may create drift errors. The image reset 205 may be a hard reset as it's associated with an initialization period.

A visual bias estimator (VBE) 207 may be fed the helmet camera data 203 and utilize it to correct IMU bias. The VBE 207 may be utilized to correct the IMU drift error that causes overshooting/undershooting of the orientation estimated. For example, the rider may turn at 90 degrees, but the IMU may read that you turned at 120 degrees, 80 degrees, or another angle. The IMU may not be correctly compensating for the errors and bias in them to correctly read the appropriate measurement. In order to compensate for the bias, another system or software may identify the ground truth. The visual estimator may utilize the helmet camera data 203, including image data along with the IMU data. Thus, VBE 207 corrects errors associated with the IMU overshooting/undershooting by comparing the IMU data with the helmet camera data 203. The VBE 207 may be utilized to correct errors associated with the IMU and measurements from associated movement.

IMU measurements 213 may be collected from both the motorcycle and the helmet. In one example, the IMU measurements 213 may be collected from the helmet only.

IMU initialization 209 may be utilized to determine the initial conditions for the integration of the IMU measurements at an initialization period. The IMU initialization 209 module may be fed the IMU measurement data 213, in addition to the camera data. Furthermore, the visual bias estimator data may be fed into the IMU integrator. The IMU integrator 211 may aggregate the IMU data ($\hat{\omega}_{helmet}$, $\hat{a}_{helmet}$) and the image data to help identify a helmet view direction ($d_h$). For example, if viewing direction is assumed to be along yaw inertial axis it is defined as $d_h := R_y^T$ as described below.

$$R_{WB}(t+\Delta t) = R_{WB}(t)\text{Exp}(\int_t^{t+\Delta t}(\int_t^{t+\Delta t}(\hat{\omega}_{helmet} - b_\omega - \eta_\omega)\delta t)$$

$$R_{WB}(t) = [R_x^T, R_y^T, R_z^T]$$

IMU integrator 211 may receive data from the IMU initialization module. The measurements collected from both the IMUs may be fed into an IMU integrator 211. The IMU integrator 211 may integrate the data from the IMU measurements and the corrected output from the VBE 207 to reduce the errors caused by bias drift ($b_\omega$) in the data from the IMU measurements.

The helmet view direction $d_h$ 215 may be output as a result of the IMU integrator 211. The helmet view direction may help to identify a rider attention verification. For example, if a rider is looking away from an object or vehicle in front of the motorcycle, the system may realize the rider is looking away from the driving path and warn the rider utilizing the HUD of the helmet. The system may also provide contextual information such as rear view camera information or other details based on the direction of the rider.

Figure 3:
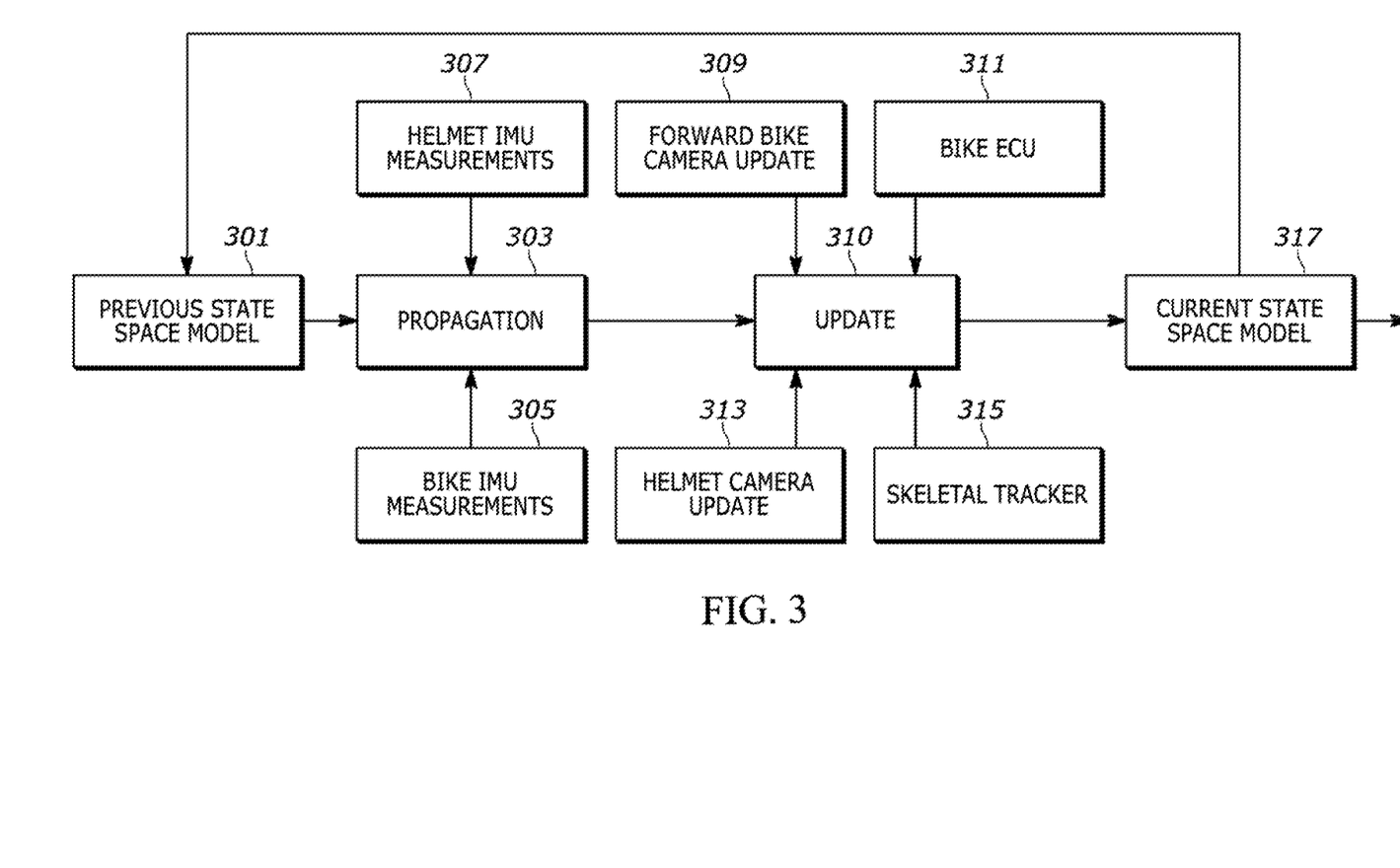
FIG. 3 is an example diagram 300 of head pose estimation.

FIG. 3 is an example diagram 300 of head pose estimation model that may be utilized with the data collected from the helmet and motorcycle. The head pose estimation may help identify how the rider is leaning into the bike. The system may look at not only the orientation but also the x, y, z position. The system of the head pose estimation may utilize data collected from sensors on both the helmet and motorcycle to describe a head pose with respect to the helmet and the PTW. The head pose estimation system may need to estimate the pose of the helmet with respect to the inertial coordinate system and the PTW coordinate system. Thus, the PTW pose $X_b$ can be used to derive the relative pose between the helmet and the PTW:

$$X_{HB} = X_H * X_B^{-1}$$

The system may assume the IMU location on the PTW (e.g. motorcycle) may be the origin of the PTW coordinate system. A combined state estimator may be composed of states from the smart helmeted and the PTW state may be estimated simultaneously. The states of the system, which are also described above, may be composed of (1) PTW position $X_b$; (2) PTW orientation $q_b$, (3) PTW velocity $V_h$;

(4) PTW IMU biases $b_b$ with respect to the inertial coordinate frame; (5) the smart helmet position $X_h$; (6) the smart helmet orientation $q_h$; (7) the smart helmet velocity $v_h$; (8) The smart helmet bias $b_h$ and (5) gravity representing the inertial coordinate system (G). Thus the state may be equal to:

$$X(t)=[X_b q_b v_b b_b X_h q_h v_h b_h G]$$

The system may perform propagation 303 on a previous state X(t−1) based on bike IMU measurements 305 and helmet IMU measurements 307. The propagation may be an estimate that is updated. The errors in the propagation may be corrected based on updated from the helmet camera, bike camera, ECU and skeleton tracker. The joint estimation may capture the measurements correlated between the bike IMU and the helmet IMU and provide better results. An iterative estimator, such as an Extended Kalman filter or non-linear optimization may be used to estimate the states in real time.

At step 310, the system may update the state model by aggregating the various data that is propagated. The updates may be utilized to correct any offsets or offshoots from measurements based on data collected by the various sensors on the motorcycle or the helmet. For example, the update may take care of the various offset errors or other errors by comparing and exchanging data collected from various IMUs and cameras (e.g., images). The image data provides visual landmarks whose residual in the images is minimized to update the IMU bias errors. The motorcycle ECU 311 may be utilized to perform various commands and instructions related to the data collected by the motorcycle, including data collected by the bike ECU.

The forward bike camera update 309 may send images from the bike camera to be utilized during the update process. The forward camera update 309 may utilize the data that is present on the bike and facing the rider in one embodiment. In another embodiment, the forward camera update 309 may utilize a camera facing away from the rider and in front of the motorcycle. The helmet camera may update 313 the provided information about the rider view. The features from the image data are extracted and matched to find relative orientation and position of the cameras. This feature may also be supported by the various IMU measurements.

The skeletal tracker 315 may be fed data identifying different skeletal parts of the rider, as well as limbs, joints, etc. The skeletal tracked extracted features from the images that represent different parts of the body. These features are correlated with the human skeleton model to track and update the system. Once all the data is fed and updated, the system may determine a current state space model 317. The current state space model 317 may identify measurements of the rider's and motorcycle's position.

Figure 4:
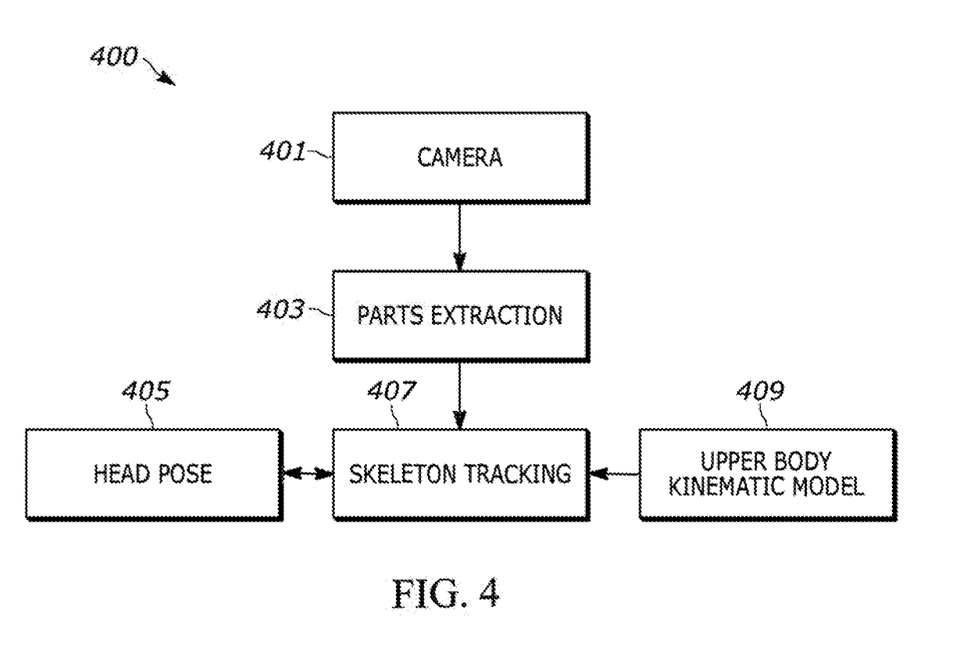
FIG. 4 is an example diagram 400 of rider body posture estimation.

FIG. 4 is an example diagram 400 of rider body posture estimation. In the PTW application, the upper body skeleton of the rider may be modeled as a tree structure that includes all the joints of the body above the hip joint. A camera facing the rider on the instrument cluster may be used to determine a location of the joints. A kinematic tree based on the upper body skeleton model may be updated when observations of the joints are made. Updates from the head pose estimation (e.g. FIG. 3) can be used to further refine the body posture estimation and vice-versa.

The camera 401 may be aimed at a rider of the motor vehicle. The camera 401 may collect images or other data to examiner various portions of a rider's body or other body parts. The camera 401 may work with a processor or controller that helps identify body parts via parts extraction 403. The camera 401 may be mounted on the motorcycle in one embodiment, and in another embodiment may be on the helmet but directed at the body of the rider. A processor may include software that is utilized for parts extraction 403. The parts extraction 403 module may have algorithms or other elements in place that are utilized to compare images of data to templates that are utilized to identify body parts. For example, the image data collected from the camera may be compared to a template that looks at outlines of the shapes taken from a person to identify certain body parts. The camera 401 may be utilized in conjunction with the parts extraction module 403 to identify various limbs (e.g. arms, legs, thighs, forearm, neck, etc.).

At step 405, the system may determine a head pose of the rider. Thus, while a typical IMU may utilize data to understand movement without a relative position in terms of an actual environment of the rider or motorcycle, the head pose software may be utilized to combine such IMU measurements with the image data to know where the head pose is relative to the bike. Thus, the head pose estimation may determine where a rider is looking relative to the bike or the body position of the rider.

At step 407, the camera may identify skeleton tracking for the various limbs of a rider's body. Thus, the system may identify the various limbs at step 403, but then begin to track those specific limbs at step 407. For example, the camera may identify an arm, and then utilize the camera to determine where the user's arm is moving. Thus, such information may be useful to determine if a user has let go off a motorcycle's handle, or turning too hard by looking at the arm.

A processor may be utilized to get the upper body kinematic model 409. A kinematic tree of the upper body skeleton model may be updated when observations of the joints are made. For example, the camera 401 may analyze the joints and see movement of the upper body. From there, various models can be compared to the current analyzation of joints in the upper body of the users.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A helmet, comprising: a transceiver configured to receive vehicle data from one or more sensors located on a vehicle; an inertial movement unit (IMU) configured to collect helmet motion data of the helmet associated with a rider of the vehicle; and a processor coupled to both the transceiver and IMU, and programmed to: receive, via the transceiver, vehicle data from the one or more sensors located on the vehicle; and determine a rider attention state, wherein the rider attention state indicates attention of the rider operating the vehicle when the vehicle is in motion, utilizing both the vehicle data received from the one or more sensors located on the vehicle and the helmet motion data from the IMU, wherein the rider attention state includes information indicating a head pose estimation on how the rider is leaning into the vehicle.

2. The helmet of claim 1, wherein the helmet further includes a camera configured to identify one or more objects in a vicinity of the vehicle.

3. The helmet of claim 1, wherein the helmet further includes an eye tracker coupled to the processor and configured to collect eye-tracking data of the rider of the vehicle.

4. The helmet of claim 1, wherein the processor is further configured to determine a head position state utilizing the helmet motion data and vehicle motion data from a vehicle inertial movement unit located on the vehicle.

5. The helmet of claim 1, wherein the processor is further configured to determine a body position state of the rider utilizing at least the helmet motion data, vehicle motion data from a vehicle inertial movement unit located on the vehicle, and image data collected from a vehicle camera configured to monitor the rider of the vehicle.

6. The helmet of claim 1, wherein the helmet includes a heads-up display configured to output graphical images on a visor of the helmet.

7. The helmet of claim 1, wherein the vehicle is a motorcycle or a powered two-wheel unit.

8. The helmet of claim 1, wherein the processor is further configured to fuse at least the motion data from the IMU of the helmet and the vehicle data.

9. A system that includes a helmet and a vehicle with at least two wheels, comprising: a helmet transceiver configured to receive vehicle data from one or more sensors located on the vehicle; a helmet inertial movement unit (IMU) configured to collect helmet motion data associated with the helmet; a rider-facing camera located on the vehicle and configured to monitor a rider of the vehicle and collect rider image data; and a processor in the helmet coupled to both the helmet transceiver and helmet IMU, and programmed to: receive, via the helmet transceiver, vehicle data from the one or more sensors located on the vehicle; and determine a rider attention state utilizing the vehicle data from the one or more sensors located on the vehicle and the helmet motion data from the IMU, wherein the rider attention state indicates attention of the rider of the vehicle including information indicating a head pose estimation on how the rider is leaning into the vehicle.

10. The system of claim 9, wherein the system further includes a forward-facing camera located on the vehicle and configured to monitor an environment proximate to the vehicle and collect object image data.

11. The system of claim 9, wherein the rider-facing camera is configured to collect image data proximate to a rider of the vehicle.

12. The system of claim 11, wherein the helmet includes a heads-up display configured to output graphical images on a visor of the helmet.

13. The system of claim 11, wherein the vehicle is a motorcycle or a powered two-wheel unit.

14. The system of claim 11, wherein the processor is further configured to determine a body position state of the rider utilizing at least the helmet motion data, vehicle motion data from a vehicle inertial movement unit located on the vehicle, and image data collected from a vehicle camera configured to monitor the rider of the vehicle.

15. The system of claim 11, wherein the processor is further configured to determine a head position state utilizing the helmet motion data and vehicle motion data from a vehicle inertial movement unit located on the vehicle.

16. A motorcycle, comprising: a transceiver configured to send to a helmet, motorcycle data from one or more sensors located on the motorcycle, and receive helmet data from the helmet; a vehicle inertial movement unit (IMU) configured to collect vehicle motion data of a rider of the motorcycle; and a processor coupled to both the transceiver and vehicle IMU, and programmed to: receive helmet data from one or more sensors located on the helmet; and determine a rider attention utilizing the helmet data received from the one or more sensors located on the motorcycle and the vehicle motion data from the vehicle IMU, wherein the rider attention state indicates attention of the rider operating the motorcycle including information indicating a head pose estimation on how the rider is leaning into the vehicle.

17. The motorcycle of claim 16, wherein the motorcycle includes a forward-facing camera configured to collect image data proximate of the motorcycle.

18. The motorcycle of claim 16, wherein the motorcycle includes a rider-facing camera configured to collect image data proximate to the rider.

19. The motorcycle of claim 16, wherein the processor is further configured to determine a body position state of the rider utilizing at least a helmet motion data collected from a helmet IMU, vehicle motion data from the vehicle IMU, and image data collected from a vehicle camera configured to monitor the rider of the vehicle.

20. The motorcycle of claim 16, wherein the processor is further configured to receive helmet motion data collected from a helmet IMU, and helmet data from the one or more sensors located on the helmet, and determine the rider attention utilizing the helmet data and helmet motion data.

* * * * *